J. W. GAMBLE.
LIQUID MEASURING APPARATUS.
APPLICATION FILED JULY 13, 1912.
1,202,049.
Patented Oct. 24, 1916.
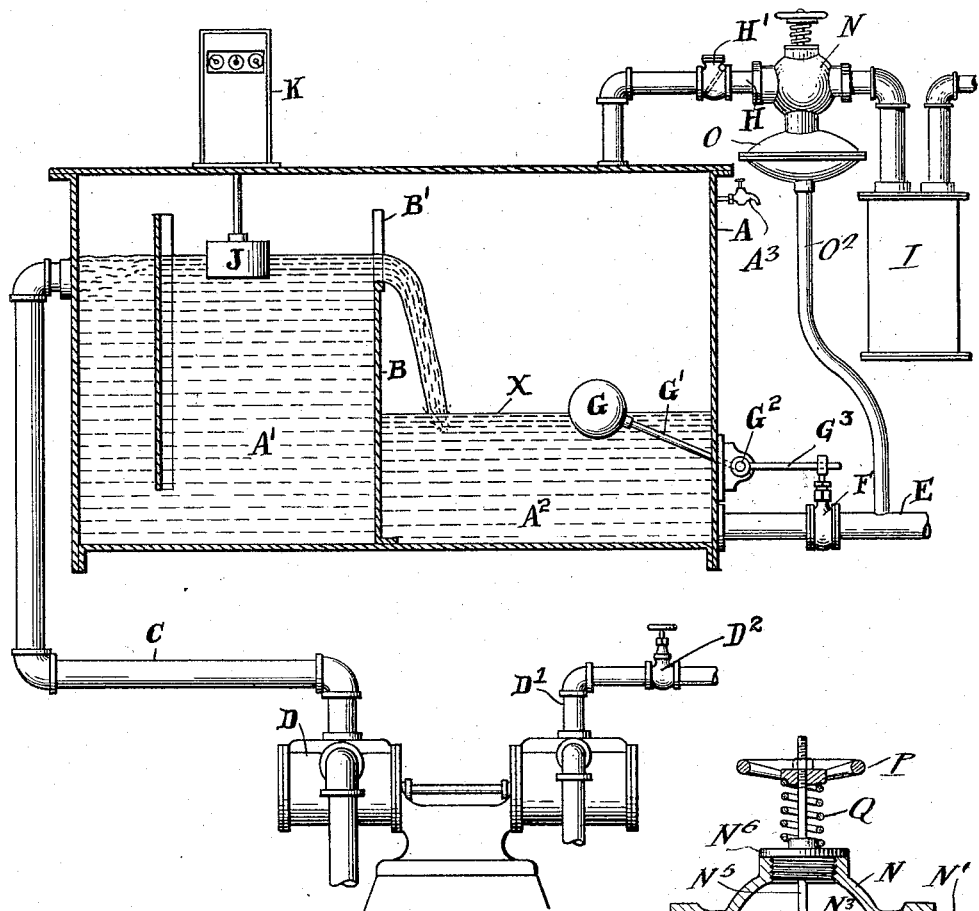

UNITED STATES PATENT OFFICE.

JOSEPH W. GAMBLE, OF PHILADELPHIA, PENNSYLVANIA, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS AS FIRM OF HARRISON SAFETY BOILER WORKS.

LIQUID-MEASURING APPARATUS.

1,202,049.   Specification of Letters Patent.   Patented Oct. 24, 1916.

Application filed July 13, 1912. Serial No. 709,193.

*To all whom it may concern:*

Be it known that I, JOSEPH W. GAMBLE, a citizen of the United States of America, residing in the city and county of Philadelphia, in the State of Pennsylvania, have invented a certain new and useful Improvement in Liquid-Measuring Apparatus, of which the following is a true and exact description, reference being had to the accompanying drawings, which form a part thereof.

My present invention relates to apparatus for measuring liquid, and has for its object to provide simple and effective means for utilizing flow measuring apparatus of a kind in which an air or vapor space must be maintained within the apparatus in the measurement of a liquid admitted to and discharged from the apparatus under pressure. For instance, the invention is well adapted for use in measuring boiler feed water by means of weir measuring apparatus interposed between the boiler feed pump and the boiler.

In carrying out my invention, I inclose the weir or other measuring apparatus employed in a housing having a valved outlet for the liquid measured, and provide means for automatically opening and closing this outlet as the liquid level in the storage space at the outlet side of the weir or other measuring apparatus rises above and falls to a predetermined minimum, and provide means for supplying to the housing air or other gaseous fluid under a pressure exceeding but varying with the pressure in the delivery pipe at the outlet side of the valve connecting it to the housing. For instance, in the case of a boiler feed water supply system, I may maintain an air pressure in the upper portion of the weir chamber exceeding the maximum pressure in the boiler to which the water measured is fed by a suitable differential. The pressure differential maintained may vary with different conditions of use. To accomplish this, I may connect the housing to a suitable source of compressed air by automatic provisions adapted to maintain a constant and definite excess of the pressure in the housing over that in the boiler as the latter pressure varies.

The various features of novelty which characterize my invention are pointed out with particularity in the claim annexed to and forming a part of this specification. For a better understanding of the invention, however, and of the advantages possessed by it, reference should be had to the accompanying drawings and descriptive matter in which I have illustrated and described forms in which my invention may be embodied.

Of the drawings, Figure 1 is a diagrammatic representation partially broken away and in section of one form of apparatus embodying my invention; and Fig. 2 is a sectional elevation of an automatic valve mechanism employed.

As shown in Fig. 1, A represents a housing divided into inlet and outlet compartments $A'$ and $A^2$ by the weir B which is formed with one or more overflow notches or orifices $B'$ at its upper edge. The rate of flow of the liquid over the weir may be indicated, recorded or integrated and registered in various known ways. As conventionally illustrated, the float J on the supply side of the weir B is arranged to operate a recording mechanism located within the casing K secured to the upper side of the housing A. Water is passed to the compartment $A'$ through the supply pipe C from a boiler feed pump D, and the measured water passes out of the weir chamber through the pipe E which opens from the lower end of compartment $A^2$ and may run to, and discharge in, a boiler or other receptacle under pressure. The flow through the pipe E is controlled by a valve F which may be of any usual or suitable form but is preferably balanced. A float G opens and closes the valve F as the water level in the compartment $A^2$ rises above and falls to a predetermined minimum, which may be that indicated by the line X. The float G is connected by the arm $G'$ to a rock shaft $G^2$, and an arm $G^3$ secured to the rock shaft $G^2$ externally of the housing A, is connected to and operates the stem of the valve F. H represents a conduit connecting the upper end of the housing A to a source, such as the compressed air reservoir I, of air or other gas or vapor under a pressure exceeding that prevailing in the pipe E on the outlet side of the valve F by an amount sufficient to force liquid out of the housing A through pipe E at a rate equal to or exceeding that at which water is pumped into the housing A through pipe C when the valve F is open. A check valve H' may be employed to prevent a back flow through the pipe H.

To vary the pressure in the vapor space within the housing A as the pressure in the delivery pipe E varies, communication between the reservoir I and the housing A is controlled by the valve N in the pipe H. As shown, the valve N comprises a casing formed with inlet and outlet chambers N' and $N^2$ respectively, separated by ports controlled by the movable double valve member $N^3$. The valve member $N^3$ is provided at its under side with a stem portion $N^4$ which is connected to a diaphragm O' located within a diaphragm chamber O. The latter is secured to the casing of the valve N and opens above the diaphragm O' to the outlet chamber $N^2$ of the valve N. The portion of the diaphragm chamber below the diaphragm O' is connected by the pipe $O^2$ to the delivery pipe E at the outlet side of the float operated valve F. With this arrangement, the pressure in the delivery pipe E at the outlet side of the valve F acts against the diaphragm O' in a direction tending to open the valve N, and the pressure in the outlet chamber of the valve casing, which, of course, is the pressure in the vapor space of the housing A, acts on the upper side of the diaphragm O' in a direction tending to close the valve N. To create the desired differential between the pressures at the outlet side of the delivery valve F and in the housing A, the valve member $N^3$ is provided with an upper stem extension $N^5$ which passes through a stuffing box $N^6$ and has its upper end threaded to receive an adjusting nut P. Between the adjusting nut P and the stuffing box $N^6$ is interposed a spring Q which exerts an additional force in the valve opening direction on the valve member $N^3$. The tension of this spring may be adjusted by rotating the nut P.

With the arrangement described, it will be apparent that the valve N and its operating mechanism will tend to maintain an air pressure in the vapor space of the housing A which will vary with the boiler pressure, but will exceed the latter by a definite amount fixed by the tension of the spring. With this arrangement it may be necessary to provide a restricted leakage outlet $A^3$ from the vapor space of the housing A so that the pressure in the vapor space may quickly fall to the required extent upon a decrease in the boiler pressure.

In the apparatus shown, as will be apparent to those skilled in the art, the pressure maintained in the vapor space of the housing A will be effective to force water out of the compartment $A^2$ through the pipe E whenever the valve F is open, and this valve opens automatically whenever the liquid level rises above the line X to thereby prevent an accumulation of water in the housing A which would interfere with the proper flow of water over the weir. The rate at which water is pumped into the housing A should obviously vary with the demand for measured water, and may be regulated as by means of the valve $D^2$ in the steam supply pipe D' of the pump D. The valve $D^2$ may obviously be controlled either manually or automatically as by any of the well known forms of boiler feed governors.

While in accordance with the provisions of the statutes, I have illustrated and described the best form of my invention now known to me, it will be apparent to those skilled in the art that changes may be made in the form of the apparatus disclosed without departing from the spirit of my invention, and that under some conditions certain features of my invention may be used with advantage without a corresponding use of other features.

Having now described my invention, what I claim as new and desire to secure by Letters Patent is:

Liquid measuring apparatus comprising in combination a housing closed to the atmosphere through which the liquid measured flows, a delivery pipe leading from said housing, a valve controlling the discharge from said housing through said delivery pipe, means responsive to the rise and fall of the liquid level in said housing for opening and closing said valve as said level rises above and falls to a predetermined height, means for maintaining within an upper portion of said housing a gaseous fluid pressure exceeding, but varying with, that in the delivery pipe at the outlet side of said valve, and means for forcing liquid into said chamber against the fluid pressure maintained therein.

JOSEPH W. GAMBLE.

Witnesses:
ROBERT G. CLIFTON,
W. ATWOOD MEHARG.